April 12, 1938.    V. J. MOIR    2,113,962
GRIPPING MEANS
Filed Aug. 13, 1935

INVENTOR.
Vincent J. Moir
BY
Hawgood and Van Horn
ATTORNEYS

Patented Apr. 12, 1938

2,113,962

UNITED STATES PATENT OFFICE 2,113,962

GRIPPING MEANS

Vincent J. Moir, Cleveland Heights, Ohio, assignor to The San-Electro Company, Cleveland, Ohio, a corporation of Ohio Application August 13, 1935, Serial No. 35,933

12 Claims. (Cl. 128—354)

This invention relates to gripping means.

An object of the invention is to provide an improved gripping means which will effectively grip and pull objects.

Another object is to provide an improved gripping means which may be simply operated from a source of power.

Another object is to provide an improved gripping means which will be simple in construction.

Another object is to provide an improved gripping means which will be neat and attractive in appearance.

Another object is to provide an improved gripping means which will always apply a predetermined pressure to objects gripped thereby.

Another object is to provide an improved gripping means which may be economically manufactured.

Another object is to provide an improved gripping means which will have relatively few moving parts.

Another object is to provide an improved gripping means which may be easily manipulated.

Other objects will hereinafter appear.

The invention will be better understood from the description of one practical embodiment thereof, (that chosen for illustration comprising an attachment for pulling hairs as is done in plucking human eyebrows, and which may conveniently be operated by any device having a rotating shaft, such for instance as a manicuring machine) illustrated in the accompanying drawing, in which.

Figure 1:
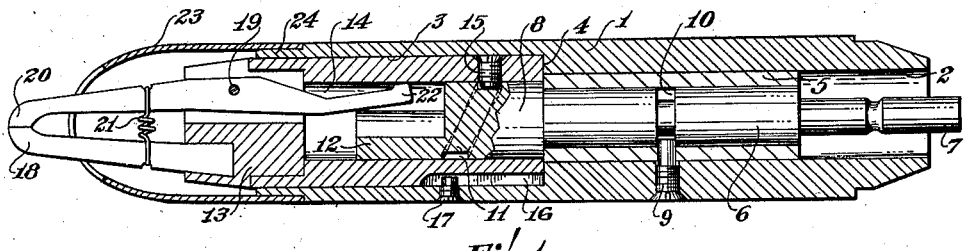
Figure 1 is a central longitudinal sectional view of the device, about twice actual size, showing the gripping elements in closed retracted position.
Figure 2:
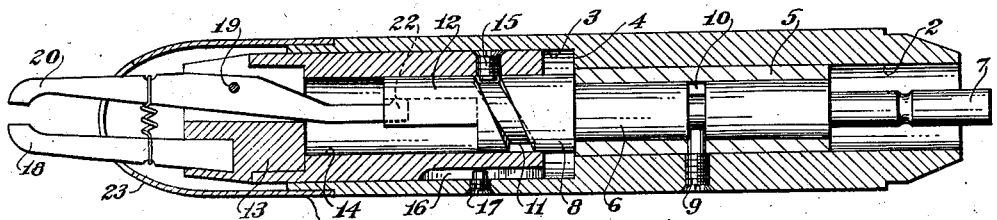
Figure 2 is a similar view showing the elements in open extended position.
Figure 3:
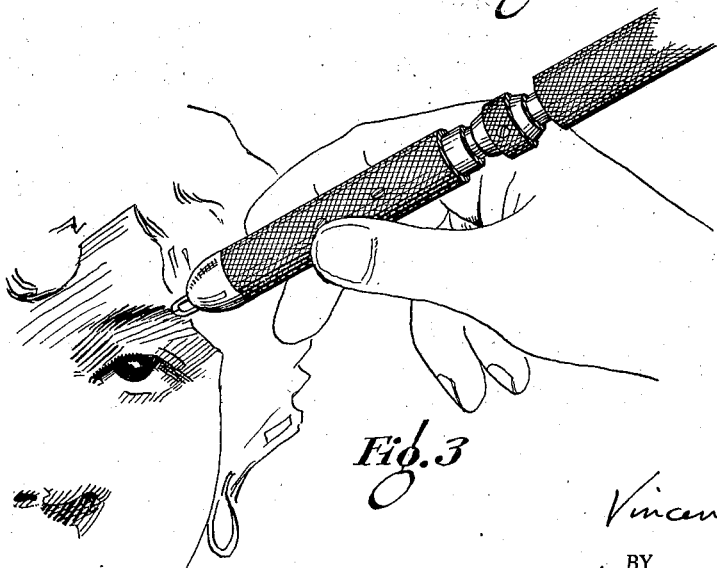
Figure 3 is an elevational view of the device.
Figure 4:
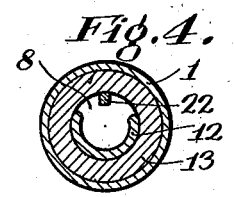
Figure 5:
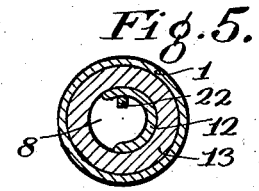

Figures 4 and 5 are cross-sectional views taken through cam 12 of Figures 1 and 2, respectively.

The device illustrated in the drawing is intended to be connected to a flexible shaft provided with a clutch, such for instance as shown in my prior Patent No. 2,008,920, patented July 23, 1935. It consists of a generally tubular body or handle 1 having throughout a portion of its extent a cylindrical bore or aperture 2, and throughout the remainder of its extent an enlarged counterbore or aperture 3, the two apertures meeting at a substantially square or radial shoulder 4.

Situated within the smaller aperture 2 is a bushing 5, which may be secured in place in any desired manner, conveniently by means of a pressed fit between the bushing and the body.

Rotatably mounted within this bushing is a spindle consisting of a supporting cylindrical portion 6 fitting within the bushing, a reduced shank 7 projecting beyond the bushing toward or beyond the rear end of the body, and an enlarged forward end 8.

A set screw 9 passes through the body and bushing and has its end received within an annular groove 10 formed in the exterior of intermediate or supporting cylindrical part 6 of the spindle, and thus locks it against axial movement.

The forward end of the spindle is provided with a continuous inclined cam groove 11 and at its end carries an arcuate flange 12 constituting another cam surface. Slidable over this portion of the spindle is a cylindrical plunger 13 having a recess 14 into which the end of the spindle projects.

A set screw 15 is threaded through the plunger and has its end within the cam groove 11, while the exterior of the plunger has an axially extending slot or keyway 16 into which projects the inner end of a set screw 17 threaded through the body, which prevents the plunger from rotating therein.

The forward end of the plunger has secured to it a fixed jaw 18, and pivotally mounted on a pin 19 is a lever including a movable jaw 20 adapted to bear against the fixed jaw. The jaws are urged toward each other by a tension spring 21.

The other end of the lever is formed into a bearing surface 22 arranged in the path of the arcuate cam of the spindle, and when engaged by this cam is moved toward the axis of the device against the tension of the spring, causing the movable jaw to separate from the fixed jaw.

When the spindle is rotated so that the cam surface of arcuate flange 12 has passed beyond bearing surface 22, it no longer holds the jaws apart, but these are drawn together, as shown in Figure 1, by the spring 21.

The plunger is reciprocated by the cam groove acting upon the set screw 15.

A slotted cap or cover 23 is frictionally retained upon the reduced end 24 of the body to enclose the plunger and rear part of the jaws.

The operation of the device is as follows:

The shank 7 is clutched to a rotatable shaft, preferably a flexible one, such as shown in my above mentioned application, by a clutch which also may be as shown therein, and the shaft set in rotation. The operator, using the body of the device as a handle, manipulates it as desired, positioning the jaws in such a manner that they may grip hairs which it is desired to extract from a subject.

The rotation of the spindle causes the plunger to reciprocate and the jaws to open and close.

It will be apparent that the cam slot and arcuate cam surface are so related that the jaws are separated by the cam surface of flange 12 while the plunger is being projected toward the left, as shown in the drawing, by cam 11 so that the jaws are permitted to close or come together when at their most extended position, that illustrated in Figure 2.

Thereafter, the jaws remain clamped upon any object which they have seized, such as hair, while the plunger is retracted, and when it has reached its extreme retracted position, the jaws are again separated to release the article gripped.

The operator need only place the jaws at the hairs it is desired to extract and the mechanism grips, pulls, and releases them. The pressure is at all times determined by the spring, so that if several hairs are gripped simultaneously, the pressure will not be sufficient to cut them, as might be the case if the jaws were positively closed.

Similarly, should the jaws grip the skin of the subject no damage can result. However, the jaws should open only a relatively small distance so that it will be difficult to grip the skin.

The device is practically free from vibration and so greatly simplifies its manipulation.

While I have described the illustrated embodiment of my invention in some particularity, obviously many other embodiments, variations and modifications will readily occur to those skilled in this art, and I do not therefore limit myself to the precise details shown and described, but claim as my invention all embodiments, modifications and variations coming within the scope of the appended claims.

I claim:

1. A power driven gripping device comprising a handle, a plunger slidable therein, means reciprocating said plunger in said handle, two relatively movable jaws carried by said plunger, resilient means urging said jaws toward each other, and means separating said jaws during reciprocation in one direction.

2. A gripping device comprising a handle, a rotatable spindle mounted therein and provided with two cam surfaces, a plunger reciprocable in the handle and provided with a pair of relatively movable jaws, means connected to the plunger engaging one of said cam surfaces, and means associated with one of the jaws and engageable by the other cam surface.

3. A gripping device comprising a handle, a rotatable spindle mounted therein, a plunger reciprocable in the handle, a gripping jaw pivoted to said plunger, a cam carried by said spindle arranged to contact said jaw to rotate the same about its pivot.

4. A gripping device comprising a handle, a rotatable spindle mounted therein, a plunger reciprocable in the handle, a gripping jaw pivoted to said plunger, a cam carried by said spindle arranged to contact said jaw to rotate the same about its pivot, and a fixed jaw carried by said plunger, and resilient means moving said jaws toward each other.

5. A gripping device comprising a tubular sleeve, a spindle journalled therein, bearing means locking the spindle against axial motion relative the sleeve, a plunger slidable in the sleeve, key means preventing rotation of the plunger with respect to the sleeve, a movable element carried by the plunger, resilient means urging the element in one direction, a cam carried by the spindle and arranged to move said element in the opposite direction, a second cam carried by the spindle, and connections between said cam and said plunger for reciprocating the plunger.

6. A gripping device comprising a tubular sleeve, a spindle journalled therein, an annular groove in the spindle, a fixed projection within the sleeve extending into said annular groove, a plunger slidable within the sleeve and in telescopic arrangement to both the sleeve and the spindle, an inclined continuous groove in the spindle, and a projection inside the plunger entering said groove.

7. A gripping device comprising a tubular sleeve, a spindle journalled therein, an annular groove in the spindle, a fixed projection within the sleeve extending into said annular groove, a plunger slidable within the sleeve and in telescopic arrangement to both the sleeve and the spindle, an inclined continuous groove in the spindle, a projection inside the plunger entering said groove, and an element pivoted to said plunger having one end projecting beyond the same and its other end received within the hollow of the plunger, a cam carried by the spindle positioned to engage said last mentioned end of the element.

8. A gripping device comprising a tubular sleeve, a spindle journalled therein, an annular groove in the spindle, a fixed projection within the sleeve extending into said annular groove, a plunger slidable within the sleeve and in telescopic arrangement to both the sleeve and the spindle, an inclined continuous groove in the spindle, a projection inside the plunger entering said groove, an element pivoted to said plunger having one end projecting beyond the same and its other end received within the hollow of the plunger, a cam carried by the spindle positioned to engage said last mentioned end of the element, and resilient means urging the element in one direction.

9. A gripping device comprising a tubular sleeve, a spindle journalled therein, an annular groove in the spindle, a fixed projection within the sleeve extending into said annular groove, a plunger slidable within the sleeve and in telescopic arrangement to both the sleeve and the spindle, an inclined continuous groove in the spindle, a projection inside the plunger entering said groove, an element pivoted to said plunger having one end projecting beyond the same and its other end received within the hollow of the plunger, an arcuate cylindrical flange on the spindle positioned to engage said last mentioned end of the element.

10. A gripping device comprising a tubular sleeve, a spindle journalled therein, an annular groove in the spindle, a fixed projection within the sleeve extending into said annular groove, a hollow plunger slidable within the sleeve and in telescopic arrangement to both the sleeve and the spindle, an inclined continuous groove in the spindle, a projection inside the plunger entering said groove, an element pivoted to said plunger having one end projecting beyond the same and its other end received within the hollow of the plunger, and a parti-cylindrical flange on the spindle positioned to engage said last mentioned end of the element, and a cover frictionally engaging the sleeve and enclosing the end of the plunger.

11. A gripping device comprising a tubular sleeve, a bushing secured therein, a spindle journalled in the bushing, an annular groove in the spindle, a projection extending into said annular groove and fixed to said sleeve, said spindle having a shank adapted to be connected to a rotating element, a cam groove in said spindle and an arcuate cylindrical cam on the end thereof, a plunger in telescopic engagement with the interior of the sleeve and exterior of the spindle, means keying the plunger to the spindle, a projection within the plunger engaging the first mentioned cam of the spindle, a fixed jaw secured to the plunger, a movable jaw pivoted to the plunger, and a spring urging the movable jaw toward the fixed jaw, one end of the movable jaw being positioned in the path of the arcuate cam.

12. A gripping device comprising a tubular sleeve, a bushing secured therein, a spindle journalled in the bushing, an annular groove in the spindle, a projection extending into said annular groove and fixed to said sleeve, said spindle having a shank adapted to be connected to a rotating element, a cam groove in the said spindle and an arcuate cylindrical cam on the end thereof, a plunger in telescopic engagement with the interior of the sleeve and exterior of the spindle, means keying the plunger to the spindle, a projection within the plunger engaging the first mentioned cam of the spindle, a fixed jaw secured to the plunger, a movable jaw pivoted to the plunger, a spring urging the movable jaw toward the fixed jaw, one end of the movable jaw being positioned in the path of the arcuate cam, and a cover frictionally secured to the sleeve enclosing the plunger and provided with an aperture through which the jaws project.

VINCENT J. MOIR.